(12) United States Patent
Hsu et al.

(10) Patent No.: US 8,283,994 B2
(45) Date of Patent: Oct. 9, 2012

(54) DIFFERENTIAL SIGNAL TRANSMISSION DEVICE

(75) Inventors: Shou-Kuo Hsu, Taipei Hsien (TW); Cheng-Hsien Lee, Taipei-Hsien (TW); Ying-Tso Lai, Taipei Hsien (TW); Hsiao-Yun Su, Taipei Hsien (TW); Jia-Chi Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 655 days.

(21) Appl. No.: 12/560,445

(22) Filed: Sep. 16, 2009

(65) Prior Publication Data
US 2011/0038427 A1 Feb. 17, 2011

(51) Int. Cl.
*H03H 7/38* (2006.01)
(52) U.S. Cl. ........................ 333/124; 375/259
(58) Field of Classification Search ............. 333/124, 333/130, 32; 375/259, 260
See application file for complete search history.

(56) References Cited

U.S. PATENT DOCUMENTS

| 4,286,114 A | * | 8/1981 | Dannenmann et al. | .. 379/206.01 |
| 6,226,330 B1 | * | 5/2001 | Mansur | ............ 375/257 |
| 7,573,353 B2 | * | 8/2009 | Hsu et al. | ............ 333/125 |
| 2004/0266346 A1 | * | 12/2004 | Beierle | ............ 455/13.4 |

* cited by examiner

Primary Examiner — Dean O Takaoka
Assistant Examiner — Alan Wong
(74) Attorney, Agent, or Firm — Altis Law Group, Inc.

(57) ABSTRACT

A differential signal transmission device transmits N differential signal pairs from a differential signal generator to a number of receiving terminals. The N differential signal pairs include N positive signals and N negative signals. The N positive signals are clustered at a first positive clustering point. The first positive clustering point is connected to a second positive clustering point via a first matching resistor. The second positive clustering point is grounded via a first grounding resistor, and outputs a number of positive signals to the number of receiving terminals respectively. The N negative signals are clustered at a first negative clustering point. The first negative clustering point is connected to a second negative clustering point via a second matching resistor. The second negative signal clustering point is grounded via a second grounding resistor, and outputs a number of negative signals to the number of receiving terminals respectively.

3 Claims, 2 Drawing Sheets

DIFFERENTIAL SIGNAL TRANSMISSION DEVICE

BACKGROUND

1. Technical Field

The present disclosure relates to differential signal transmission devices, and particularly to a differential clock signal transmission device.

2. Description of Related Art

Clock signals are significant for an electronic device to synchronously activate components in the electronic device. A number of differential clock signal pairs from a differential clock signal generator should be equal to a number of receiving terminals when the differential clock signal pairs are transmitted by a common signal transmission device. For example, the differential clock signal generator just can provide two differential clock signal pairs to two receiving terminals. If the number of the receiving terminals is more than two, voltages at the receiving terminals may be too low and thereby unsatisfied to a required specification. Additionally, each of the receiving terminals should be grounded via a resistor when the differential clock signal pairs are transmitted by the common signal transmission device, which is costly.

DETAILED DESCRIPTION

Figure 1:
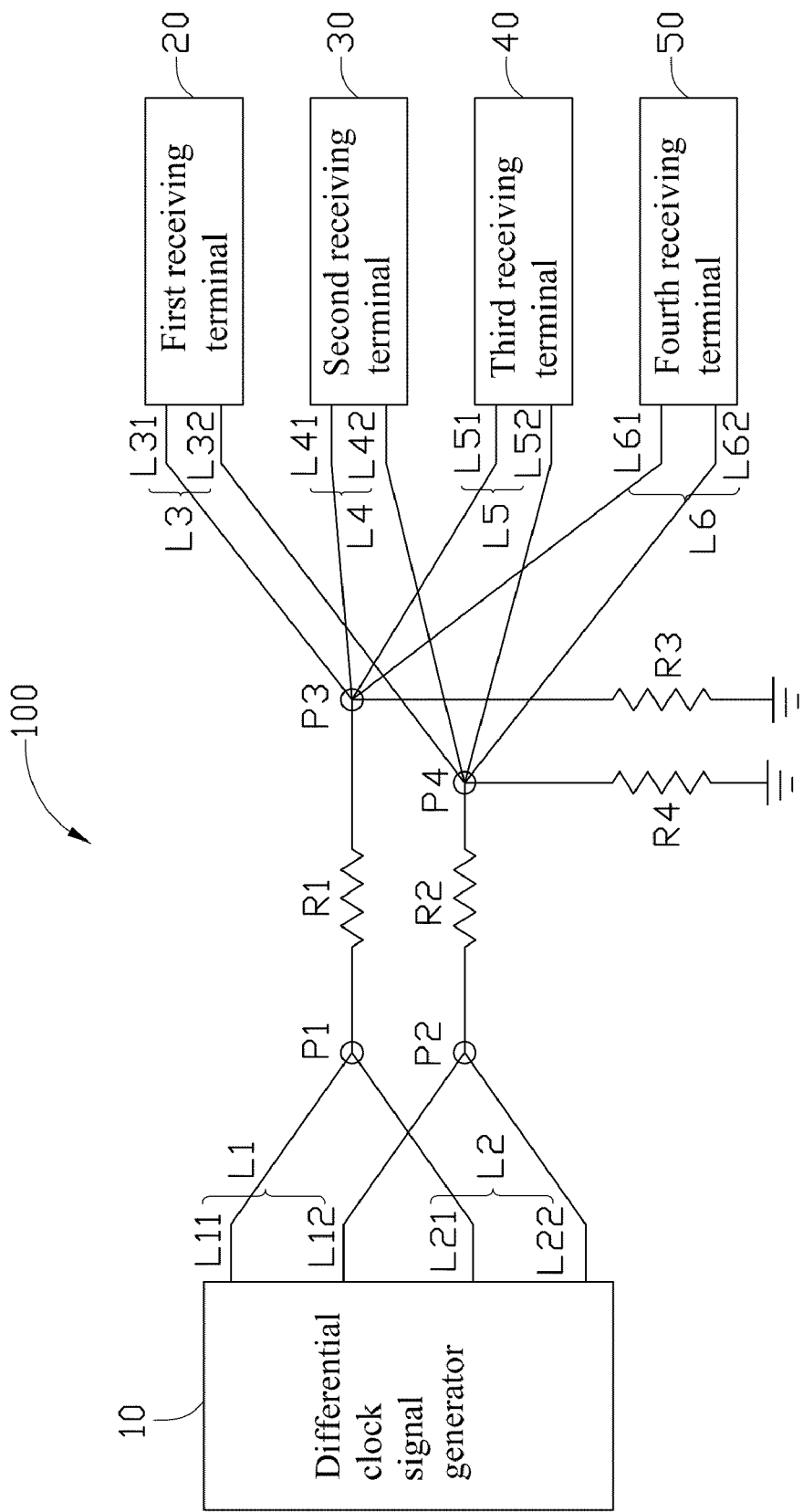
FIG. 1 is a sketch diagram of an exemplary embodiment of a differential signal transmission device.

Referring to FIG. 1, an exemplary embodiment of a differential signal transmission device 100 includes a differential clock signal generator 10, a first receiving terminal 20, a second receiving terminal 30, a third receiving terminal 40, a fourth receiving terminal 50, two matching resistors R1 and R2, and two grounding resistors R3 and R4. The differential signal transmission device 100 may be formed on a printed circuit board.

The differential clock signal generator 10 provides two differential clock signal pairs L1 and L2. The differential clock signal pair L1 includes a positive signal L11 and a negative signal L12. The differential clock signal pair L2 includes a positive signal L21 and a negative signal L22. The positive signals L11 and L21 are clustered at a first positive clustering point P1. The negative signals L12 and L22 are clustered at a first negative clustering point P2.

The first positive clustering point P1 is connected to a second positive clustering point P3 via the matching resistor R1. The second positive clustering point P3 is grounded via the grounding resistor R3, and outputs four positive signals L31, L41, L51, and L61. The first negative clustering point P2 is connected to a second negative clustering point P4 via the matching resistor R2. The second negative clustering point P4 is grounded via the grounding resistor R4, and outputs four negative signals L32, L42, L52, and L62.

The positive signal L31 and the negative signal L32 are combined to form a differential clock signal pair L3, and are provided to the first receiving terminal 20. The positive signal L41 and the negative L42 are combined to form a differential clock signal pair L4, and are provided to the second receiving terminal 30. The positive signal L51 and the negative L52 are combined to form a differential clock signal pair L5, and are provided to the third receiving terminal 40. The positive signal L61 and the negative L62 are combined to form a differential clock signal pair L6, and are provided to the fourth receiving terminal 50.

Since the two differential clock signal pairs L1 and L2 from the differential clock signal generator 10 are provided for the receiving terminals 20-50 via the points P1-P4, which means that the differential clock signal pairs L1 and L2 are clustered to be a signal, and then the signal is divided into four differential clock signal pairs L3-L6. Therefore, clock phases of the four differential clock signal pairs L3-L6 are synchronous, which means that there is no phase difference among the differential clock signal pairs L3-L6.

The exemplary embodiment of the differential signal transmission device 100 is also capable of providing the differential clock signal pairs L3-L6 with a required specification according to the determined resistances of the grounding resistors R3 and R4. Further details about how to determine the resistances of the grounding resistors R3 and R4 will be explained in further detail below.

Currents of the differential clock signal pairs L1 and L2 provided by the differential clock signal generator 10 are both equal to a current I. Resistances of the grounding resistors R3 and R4 are both equal to a resistance R. Therefore, a current passing through the grounding resistor R3 is 2I, a current passing through the grounding resistor R4 is −2I, and a voltage Vin of each of the receiving terminals 20-50 is equal to a voltage difference between the second positive clustering point P3 and the second negative clustering point P4. The voltage Vin is obtained according to Vin=(V+)−(V−) =2I*R3−(−2I)*R4=2I*(R3+R4)=4IR, wherein the V+ is a voltage at the second positive clustering point P3, and the V− is a voltage at the second negative clustering point P4. Therefore, for example, when the voltage Vin of each of the receiving terminals 20-50 is required to be about 700 millivolts (mV), and the current I of each of the differential clock signal pairs L1, L2 is about 7 milliamperes (mA), the resistance R of each of the grounding resistors R3 and R4 can be determined according to R=Vin/4I=700 mV/4*7 mA=25 ohms.

Figure 2:
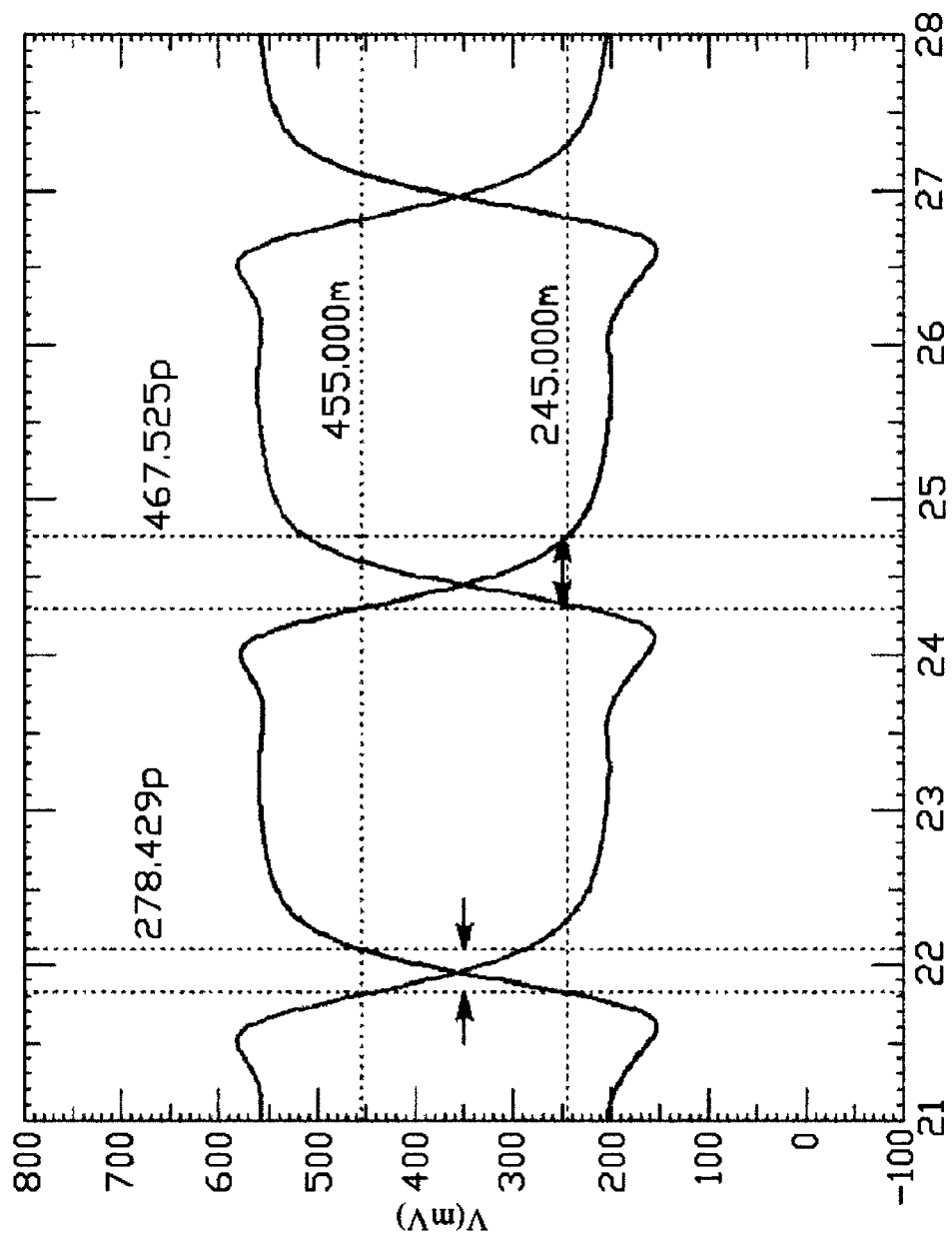
FIG. 2 shows an exemplary waveform graph of a differential signal transmitted by the differential signal transmission device of FIG. 1.

Referring to FIG. 2, the differential signal transmission device 100 is simulated via a common simulation software, to determine whether the differential clock signal pairs L3-L6 satisfy a required specification or not. In one exemplary embodiment, when a rise time and a fall time of each of the differential clock signal pairs L3-L6 are both between 150~700 picoseconds (ps), the differential clock signal pairs L3-L6 are determined to be acceptable. The rise time is defined as a period during which a voltage of each of the differential clock signal pairs L3-L6 rising from 245 mV to 455 mV. The fall time is defined as a period during which a voltage of each of the differential clock signal pairs L3-L6 falling from 455 mV to 245 mV. FIG. 2 illuminates that the rise time of each of the differential clock signal pairs L3-L6 is about 278.429 ps, and the fall time of each of the differential clock signal pairs L3-L6 is about 467.525 ps. Therefore, the differential clock signal pairs L3-L6 are acceptable.

In other exemplary embodiments, the differential clock signal generator 10 can provide the differential clock signal pairs L1 and L2 both with a current I to two or three receiving terminals via the matching resistors R1 and R2, and the grounding resistors R3 and R4. A voltage of each of the receiving terminals is still equal to Vin=(V+)−(V−)=2I*R3− (−2I)*R4=2I*(R3+R4)=4IR; wherein R is the resistance of each of the grounding resistors R3 and R4.

In another exemplary embodiment, the differential clock signal generator 10 can provide three differential clock signal pairs all with a current I to six receiving terminals via the matching resistors R1 and R2, and the grounding resistors R3 and R4 both with a resistance Rx. If a voltage of each of the six receiving terminals should be still equal to 4IR, which is the voltage Vin of each of the four receiving terminals 20-50, the resistance Rx of each of the two grounding resistors R3 and R4 can be obtained according to 2Rx=4IR/3I=4R/3=4*25/3=33.3 ohms, therefore Rx=16.7 ohms.

In summary, if a voltage at each of the receiving terminals is required to be V, and the differential clock signal generator 10 provides N differential clock signal pairs all with a current I, a sum of the resistances of the grounding resistors R3 and R4 are equal to V/N*I. The differential clock signal pairs can be acceptable via adjusting the resistances of the grounding resistors R3 and R4 when the number of the receiving terminals is more than N. Since there is some voltage loss in the signal transmission, the number of the positive signals from the second positive clustering point P3 and the number of the negative signals from the second negative clustering point P4 both should be better to not greater than 2 N, therefore, the number of the receiving terminals is not greater than 2 N.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A differential signal transmission device, comprising:
   a differential signal generator providing N differential signal pairs to a plurality of receiving terminals, wherein the N differential signal pairs comprises N positive signals and N negative signals, the N positive signals are clustered at a first positive clustering point, and the N negative signals are clustered at a first negative clustering point; wherein N is a natural number greater than 1;
   a first grounding resistor;
   a second grounding resistor;
   a first matching resistor connected between the first positive clustering point and a second positive clustering point; wherein the second positive clustering point is grounded via the first grounding resistor, and outputs a plurality of positive signals; and
   a second matching resistor connected between the first negative clustering point and a second negative clustering point; wherein the second negative clustering point is grounded via the second grounding resistor, and outputs a plurality of negative signals;
   wherein each of the receiving terminals receives one of the plurality of positive signals from the second positive clustering point, and one of the plurality of negative signals from the second negative clustering point.

2. The differential signal transmission device of claim 1, wherein the plurality of positive signals from the second positive clustering point are corresponding to the plurality of negative signals from the second negative clustering point respectively, and the number of the plurality of positive signals from the second positive clustering point and the number of the plurality of negative signals from the second negative clustering point are both not greater than 2N.

3. The differential signal transmission device of claim 1, wherein when a required voltage of each of the receiving terminals is V, and a current of each of the N differential signal pairs from the differential signal generator is I, a sum of resistances of the first and second grounding resistors is determined to be V/(N*I).

\* \* \* \* \*

UNITED STATES PATENT AND TRADEMARK OFFICE
CERTIFICATE OF CORRECTION

PATENT NO. : 8,283,994 B2
APPLICATION NO. : 12/560445
DATED : October 9, 2012
INVENTOR(S) : Shou-Kuo Hsu et al.

Page 1 of 1

It is certified that error appears in the above-identified patent and that said Letters Patent is hereby corrected as shown below:

Title Page, below Item (65) insert

-- (30)   Foreign Application Priority Data

Aug. 12, 2009   (CN) .............................200910305527.4 --

Signed and Sealed this
Twenty-ninth Day of October, 2013

Teresa Stanek Rea
*Deputy Director of the United States Patent and Trademark Office*